(12) United States Patent
Nguyen et al.

(10) Patent No.: US 6,772,366 B2
(45) Date of Patent: Aug. 3, 2004

(54) METHOD AND APPARATUS FOR DETECTING AC REMOVAL

(75) Inventors: Don Nguyen, Portland, OR (US); Barnes Cooper, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 396 days.

(21) Appl. No.: 09/802,451

(22) Filed: Mar. 9, 2001

(65) Prior Publication Data

US 2002/0152417 A1 Oct. 17, 2002

(51) Int. Cl.[7] .................................................. G06F 11/00
(52) U.S. Cl. ............................ 714/10; 714/22; 713/323; 713/340
(58) Field of Search ............................ 714/10, 22, 330, 714/323, 340; 713/330, 323, 340

(56) References Cited

U.S. PATENT DOCUMENTS

| | | |
|---|---|---|
| 5,021,679 A | 6/1991 | Fairbanks et al. |
| 5,153,535 A | 10/1992 | Fairbanks et al. |
| 5,307,003 A | 4/1994 | Fairbanks et al. |
| 5,581,772 A * | 12/1996 | Nanno et al. ............... 713/340 |
| 5,627,412 A | 5/1997 | Beard |
| 5,752,011 A | 5/1998 | Thomas et al. |
| 5,872,984 A * | 2/1999 | Berglund et al. ........... 713/340 |
| 5,884,233 A * | 3/1999 | Brown ........................ 702/61 |
| 5,974,557 A | 10/1999 | Thomas et al. |
| 6,035,408 A * | 3/2000 | Huang ........................ 713/320 |
| 6,079,026 A * | 6/2000 | Berglund et al. ........... 713/340 |
| 6,195,754 B1 * | 2/2001 | Jardine et al. .............. 713/324 |
| 6,216,235 B1 | 4/2001 | Thomas et al. |
| 6,367,023 B2 * | 4/2002 | Kling et al. ................ 713/340 |
| 6,463,545 B1 * | 10/2002 | Fisher et al. ................ 713/340 |
| 6,470,290 B1 * | 10/2002 | Lee et al. .................... 702/132 |
| 6,487,668 B2 | 11/2002 | Thomas et al. |

* cited by examiner

Primary Examiner—Robert Beausoliel
Assistant Examiner—Yolanda L Wilson
(74) Attorney, Agent, or Firm—Blakely, Sokoloff, Taylor & Zafman LLP

(57) ABSTRACT

A method and apparatus for transitioning the CPU of a computer system to a lower performance level upon removal of AC power. Circuitry within the system input power control detects the removal of the AC power. The circuitry generates an event that causes power management software to immediately transition the CPU to a lower performance level sufficient to prevent the unwanted shutdown of the system. The AC power removal detection and CPU transition are effected while the system maintains an operational power level due to residual power in the system capacitors.

18 Claims, 5 Drawing Sheets

METHOD AND APPARATUS FOR DETECTING AC REMOVAL

FIELD OF THE INVENTION

This invention relates generally to mobile computing systems, and more specifically to a method for quickly detecting the removal of alternating current and transitioning system processor to a low performance level in response.

BACKGROUND OF THE INVENTION

Today mobile computing systems (MCSs) can be made to operate at frequencies close to those of a desktop computer. For example, MCSs can operate at 850 MHz while a typical desktop operates at 1 GHz. To take advantage of system performance, a MCS will typically have an alternating current (AC) mode for use when an AC line voltage source is available. The AC mode allows for maximized operating frequency at the expense of power consumption. MCSs also have the ability to recognize when AC power is available and automatically switch to a higher frequency (e.g., 850 MHz). When the AC source is removed (i.e., when the AC adapter is removed), and power is supplied by a limited direct current (DC) source (e.g., a battery), the MCS is transitioned to a lower performance level (i.e., the CPU is transitioned to a lower frequency (e.g., 500 MHz) and thus a lower voltage). The lower operating frequency provides extended battery life. The transition to a lower performance level involves circuitry to detect AC power removal and software to effect CPU transition to a lower frequency.

Detection of the removal of AC power is typically accomplished by including AC detection circuitry within a system's input power control circuitry as shown in FIG. 1. FIG. 1 depicts a typical system input power control block diagram for a MCS according to the prior art. The AC adapter voltage 101 is typically 15 –18V. This voltage is filtered by a common-mode choke 102 to filter out unwanted input noise. The adapter voltage sources current to power the MCS and recharges the battery 106 through a diode, $D_{Adapter}$, 103. The Battery Charger 104 charges the battery 106 through a charging path controlled by a P-Channel mosfet, $Q_{CHRG}$, 105. A typical battery voltage ranges from 7.5V to 12.6V. When the AC adapter is not plugged into the system, the battery provides current to power the system through a discharging path controlled by $Q_{DISCHRG}$, 107. The node 108 at which the cathode of the $D_{ADAPTER}$ diode 103 and the source of $Q_{DISCHRG}$ 107 meet is typically where the AC detection circuitry 109 is located. The capacitors between the AC adapter voltage 101 and the AC detection circuitry 109 continue to hold up the voltage level for some time after the AC adapter voltage 101 is removed. It can, therefore, take several milliseconds (ms) to detect the removal of the AC adapter voltage 101.

This time is dwarfed by the approximately 2 seconds that the typical power management software (PMS) takes to transition the CPU after AC power removal has been detected. The typical (PMS) includes a driver that periodically polls the system to determine if AC power is available. If AC power is not available, the PMS transitions the CPU to a lower performance level. The polling interval could be set to as low as 50 ms, but this would require CPU time and therefore, adversely affect system performance.

During the time it takes for the MCS to realize that the AC power has been removed and transition the CPU to a lower frequency, the MCS is typically operating at its highest performance level and therefore still using power at a maximum rate. This situation presents difficulties especially for the smaller, lighter weight, mobile systems. Smaller, lighter weight, MCSs, typically have only three cells serially connected, having a resultant impedance of 300 ohms. This impedance can rise significantly (e.g., 50%) for batteries that are nearly discharged. The high impedance associated with this situation causes the power drain on the battery to attain and exceed maximum levels, typically 30 watts. When the MCS operates at a high frequency the processor draws more power that in-turn causes other components to draw more power. This power consumption adds up to exceed the maximum battery output. The battery pack has a protection circuit that monitors the power that the battery is supplying. When the maximum is exceeded the battery will not supply power and the MCS will be shut down or reset. This causes a loss of current data; work in-progress will be lost. Also, resuming from a powered-off state uses some of the limited battery power. To avoid this unwanted system shutdown, the MCS must be able to detect AC power removal and transition the CPU to a lower performance level within roughly 2 ms. This grace period is due to the fact that the capacitance of a typical system input power control circuit provides residual power for approximately 2 ms as discussed above.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

An embodiment of the present invention provides a method and apparatus for the quick transitioning of a system processor to a lower performance level in response to the removal of AC power. A performance level is a specified operating frequency and its associated voltage. An embodiment of the present invention provides AC detection circuitry and PMS that detect AC power removal and transition the MCS system CPU to a lower performance level respectively. The transition to the lower performance level is effected quickly enough to avoid an unwanted system shutdown.

Figure 2:
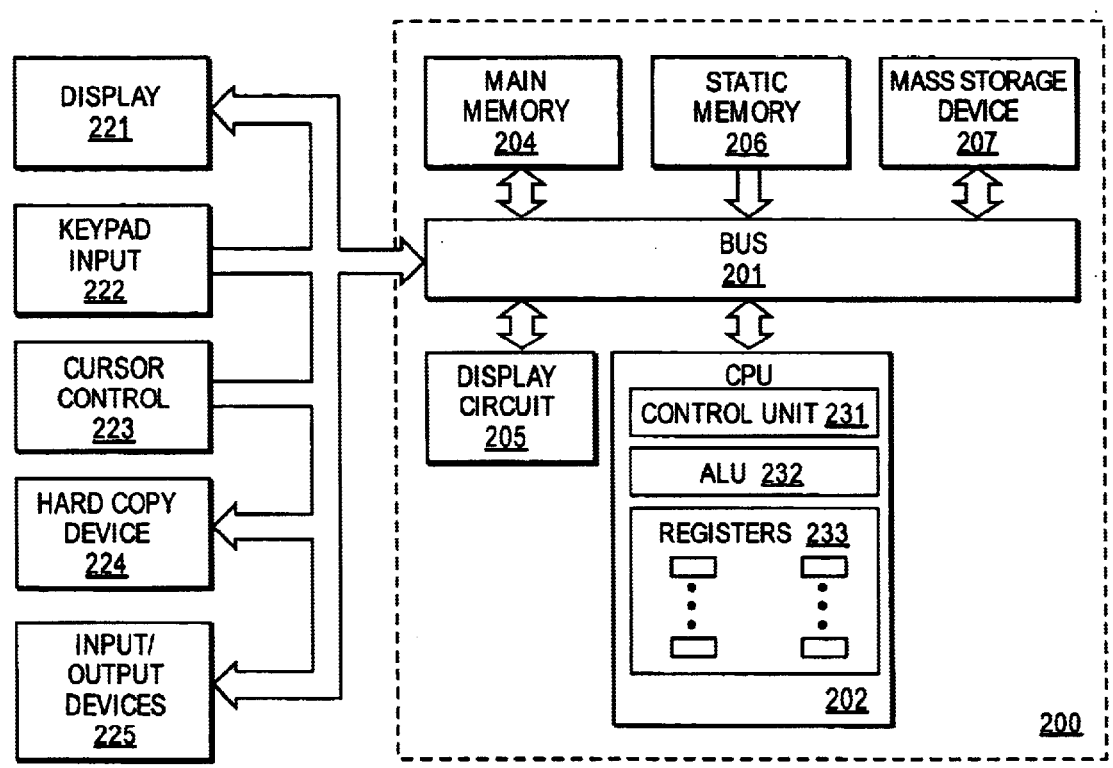
FIG. 2 is a diagram illustrating an exemplary computer system for implementing the present invention.

FIG. 2 is a diagram illustrating an exemplary computer system 200 for implementing the present invention. The detection of AC power removal, the implementation of interrupt-driven software to transition the CPU to a lower performance level, and the synchronization of such code with existing PMS, described herein, can be implemented and utilized within computing system 200. Computing system 200 can represent a general-purpose computer, portable computer, or other like device. The components of computing system 200 are exemplary in which one or more components can be omitted or added.

Referring to FIG. 2, computing system 200 includes a central processing unit 202 coupled to a display circuit 205, main memory 204, static memory 206, and mass storage device 207 via bus 201. Computing system 200 can also be coupled to a display 221, keypad input 222, cursor control 223, hard copy device 224, and input/output (I/O) devices 225 via bus 201.

Bus 201 is a standard system bus for communicating information and signals. CPU 202 is a processing unit for computing system 200. CPU 202 can be used to process information for computing system 200. CPU 202 can operate at different performance levels. CPU 202 includes a control unit 231, an arithmetic logic unit (ALU) 232, and several registers 233, which are used to process information.

Main memory 204 can be, e.g., a random access memory (RAM) or some other dynamic storage device, for storing information or instructions (program code), which are used by CPU 202. Main memory 204 may also store temporary variables or other intermediate information during execution of instructions by CPU 202. Static memory 206, can be, e.g., a read only memory (ROM) and/or other static storage devices, for storing information or instructions, which can also be used by CPU 202. Mass storage device 207 can be, e.g., a hard or floppy disk drive or optical disk drive, for storing information or instructions for computing system 200.

Display 221 can be, e.g., a cathode ray tube (CRT) or liquid crystal display (LCD). Display device 221 displays information or graphics to a user. Computing system 200 can interface with display 221 via display circuit 205. Keypad input 222 is an alphanumeric input device for communicating information and command selections to computing system 200. Cursor control 223 can be, e.g., a mouse, a trackball, or cursor direction keys, for controlling movement of an object on display 221. Hard copy device 224 can be, e.g., a laser printer, for printing information on paper, film, or some other like medium. A number of input/output devices 225 can be coupled to computing system 200.

The CPU performance level transition software, described herein, can be implemented by hardware and/or software contained within computing system 200. For example, CPU 202 can execute code or instructions stored in a machine-readable medium, e.g., main memory 204, to decide when to transition the CPU performance level on a CPU that supports multiple performance levels.

The machine-readable medium may include a mechanism that provides (i.e., stores and/or transmits) information in a form readable by a machine such as computer. For example, a machine-readable medium may include a read only memory (ROM), random access memory (RAM), magnetic disk storage media, optical storage media, flash memory devices. The code or instructions can be represented by carrier wave signals, infrared signals, digital signals, and by other like signals.

Figure 1:
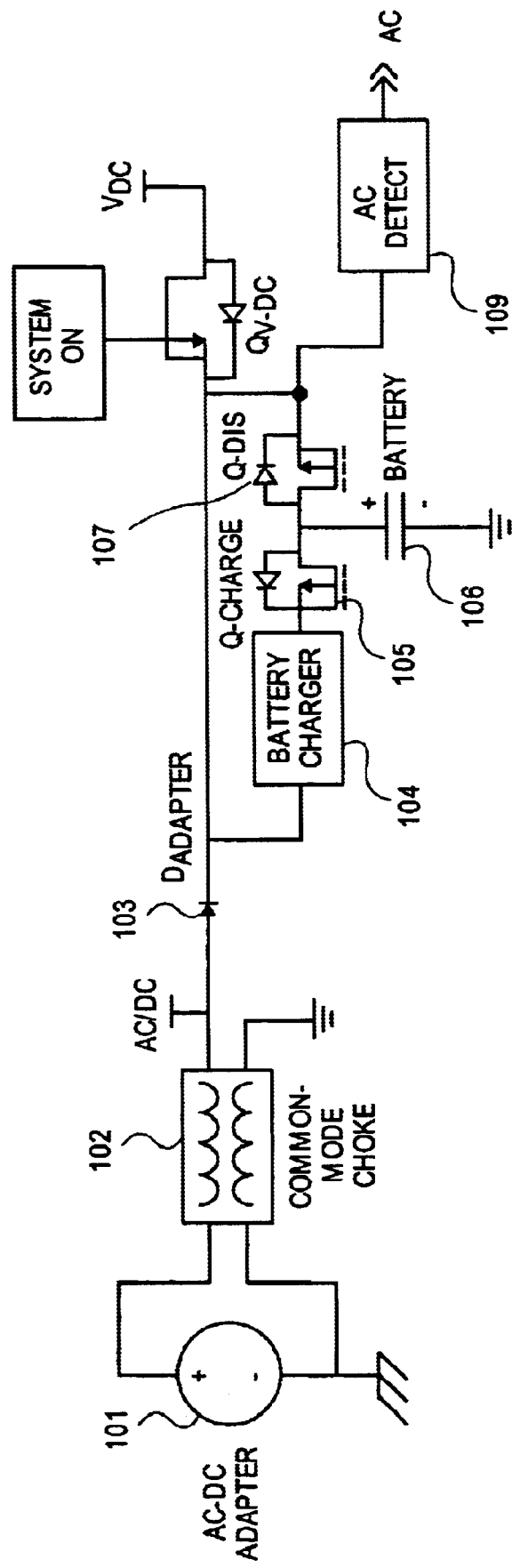
FIG. 1 depicts an input power control block diagram for a MCS according to the prior art.

AC Power Removal Detection Circuitry:

In order to effect CPU transition to a lower performance level, the AC power removal must be detected as soon as possible. As shown in FIG. 1 above, typical input power-control circuitry includes AC detection circuitry placed after the diode, referenced in FIG. 1 as $D_{Adapter}$, diode 103. When the AC adapter is removed, the capacitors between the power and the AC detection circuitry hold up the voltage for several milliseconds. In one embodiment of the present invention, therefore, the AC detection circuitry is placed before the capacitance that significantly reduces the detection time.

Another draw back of typical AC detection circuitry is that the AC voltage is compared to ground (i.e., the actual voltage of the AC source is monitored). Such circuitry fails to account for tolerances within the source device as well as voltage drop on typical connecting cable.

Figure 3:
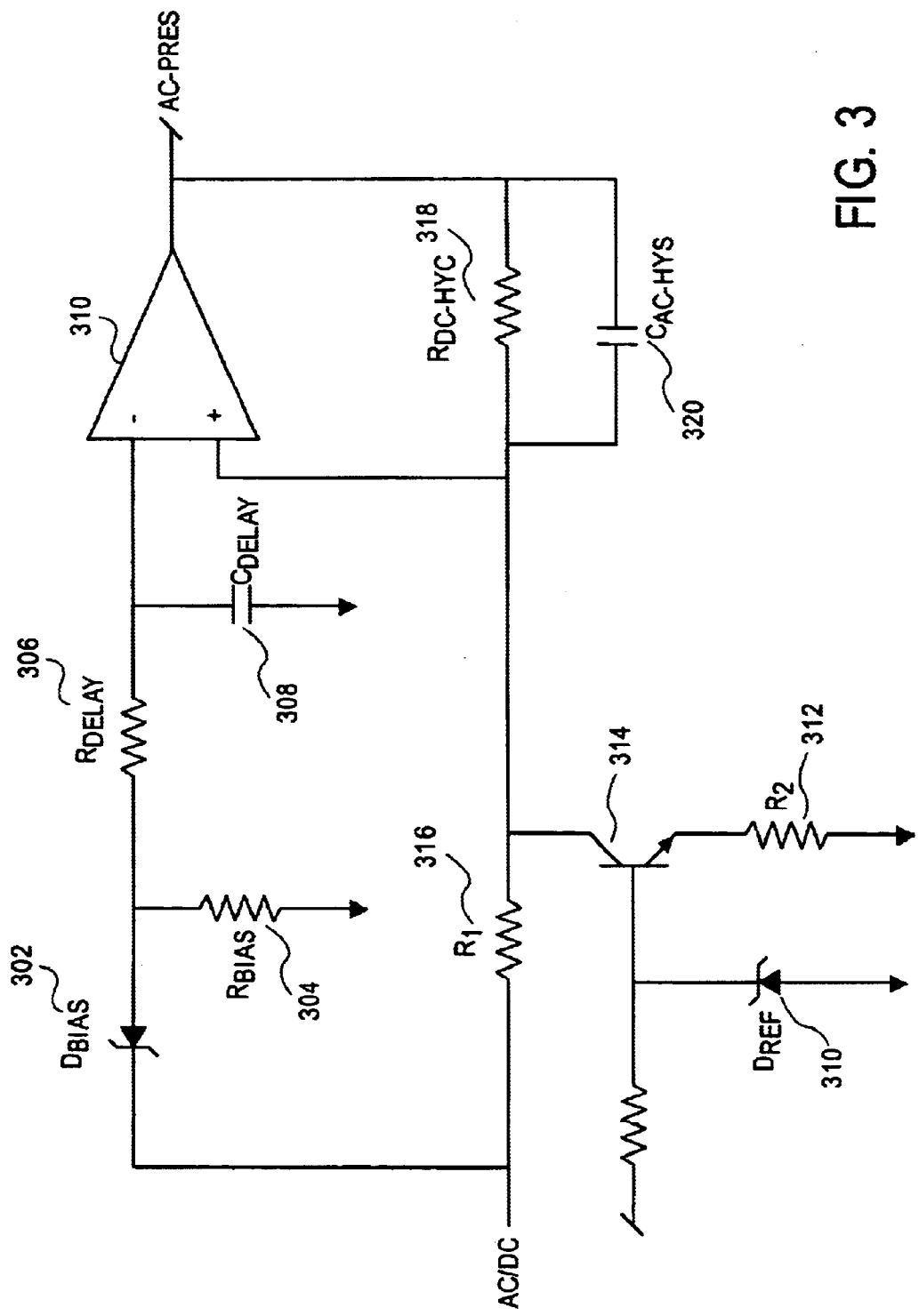
FIG. 3 is a block diagram of a differential voltage detection circuit that can be used to detect AC power removal in accordance with one embodiment of the present invention.

FIG. 3 is a block diagram of a differential voltage detection circuit that can be used to detect AC power removal. The circuit shown in FIG. 3 detects a change in the output of the AC adapter. For example, the differential voltage to be detected may be 1.2V.

The input voltage to the inverting node of comparator 310 is established by diode $D_{BIAS}$ 302, resistor, $R_{BIAS}$ 304, resistor, $R_{DELAY}$ 306, and capacitor, $C_{DELAY}$ 308 to be, for example, $V_{AC/DC}$−1.2V. The input voltage to the non-inverting node of comparator 310 is established by diode, $D_{REF}$ 310, resistor, R2 312, transistor 314, and resistor, R1 316 to be slightly less than the input voltage to the inverting node. The following equation can be used to determine the voltage at the non-inverting input:

$$V_+ = V_{AC-DC} - R1\left(\frac{1.2 - V_{BE}}{R2}\right)$$

When the AC adapter is removed, $R_{DELAY}$ 306 and $C_{DELAY}$ 308 hold up the voltage at the inverting input to the previous level. The time constant can be chosen to ensure that the voltage at this node does not delay excessively. The voltage at the non-inverting input changes almost immediately after the AC adapter is removed. Thus the comparator 310 would detect that the AC power has been removed when the differential voltage is attained and deassert the AC present signal. In one embodiment the differential voltage level can be adjusted by use of a voltage multiplier in place of diode, $D_{BIAS}$ 302.

As shown in FIG. 3, the AC detection circuitry includes a small DC hysteresis, provided by resistor 318, to help prevent oscillation and a small AC hysteresis, provided by capacitor 320, to quicken the output transition. The hysteresis ensures that if voltage is partially recovered, the circuit doesn't indicate re-establishment of AC power.

The detection circuitry of FIG. 3 removes from consideration the variations in the AC adapter and the voltage drop on the line and detects AC power removal upon a specified voltage drop. The circuit thus provides a faster detection mechanism than the standard voltage scheme because it does not "wait" for the voltage to decay to a certain level. And since this is a floating-type circuit, it is independent of the actual voltage of the AC adapter.

Another type of AC power removal detection circuitry that be employed in accordance with the present invention is the current mode detection circuit. With such a circuit, the current sourced by the AC adapter is monitored. If the current falls below a threshold value (taking into account the current drained by the system from the battery), the comparator would detect that the AC adapter has been removed and deassert the AC present signal. The current mode detection circuit is more complicated since detecting current requires a setting up biases for a voltage drop across a resistive element. With a current mode detection circuit there is no need to wait for voltage decay as discussed above in reference to the voltage mode detection circuit.

Figure 4:
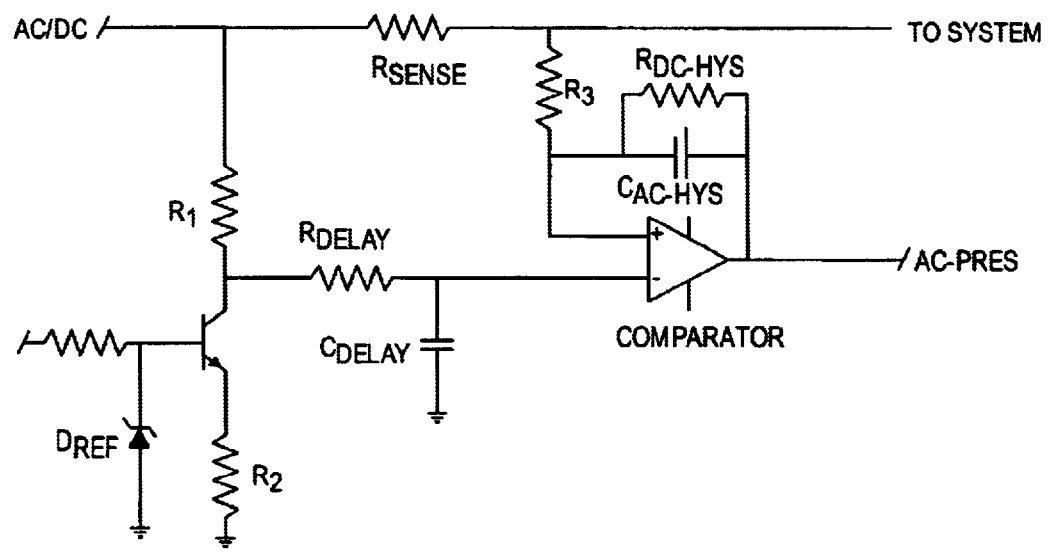
FIG. 4 is a block diagram of a current mode detection circuit that can be used to detect AC power removal in accordance with one embodiment of the present invention.

FIG. 4 is a block diagram of a current mode detection circuit that can be used to detect AC power removal in accordance with the present invention. The circuit shown in FIG. 4 includes hysteresis, provided by resistor 404, to help prevent oscillation and a small AC hysteresis, provided by capacitor 408, to quicken the output transition. The hysteresis is added for the reasons discussed above in reference to FIG. 3.

CPU Performance Level Transitioning

Detection of AC power removal using the circuits described above is accomplished within approximately 50 to 100 microseconds. One embodiment of the present invention detects AC power removal in 55 microseconds.

Once the AC power removal has been detected, the PMS transitions the CPU to a lower performance level. The transitioning of the CPU to a lower performance level must be accomplished within the approximately 2 ms that the residual power due to capacitance allows. This requirement is met by changing existing software, but only at the lowest level. Thus there is no need to change existing PMS applications and drivers, obviating the need for re-certification by software vendors.

As discussed above, a typical PMS can take approximately two seconds to complete the transition. Typically what takes place is that the power control circuitry of FIG. 1 generates an edge-triggered event to a general-purpose digital logic input of the MCS chip set. The input is configured by software to generate a system management interrupt (SMI). The SMI gives control to the PMS every two seconds. The PMS is notified of AC power availability, the preferred CPU performance level, and the number of performance levels available. The PMS contains variables that indicate the number of levels that the platform supports at the present time. In systems that require operation at only the lowest performance level while on battery, it is important that this field return the value of 1 when the system is battery powered. A value of 1, tells the PMS to immediately perform a transition to the battery optimized mode (i.e., the lowest performance level).

According to one embodiment of the present invention, another event, detection of AC power removal, generates an SMI. This takes place while the while the PMS is running. When the AC removal event takes place, the CPU is immediately transitioned to a lower performance level. Later, when the PMS is once again given control, it has been updated to indicate that the CPU has been transitioned to the lower performance level and that the lower performance level is the only one available.

Figure 5:
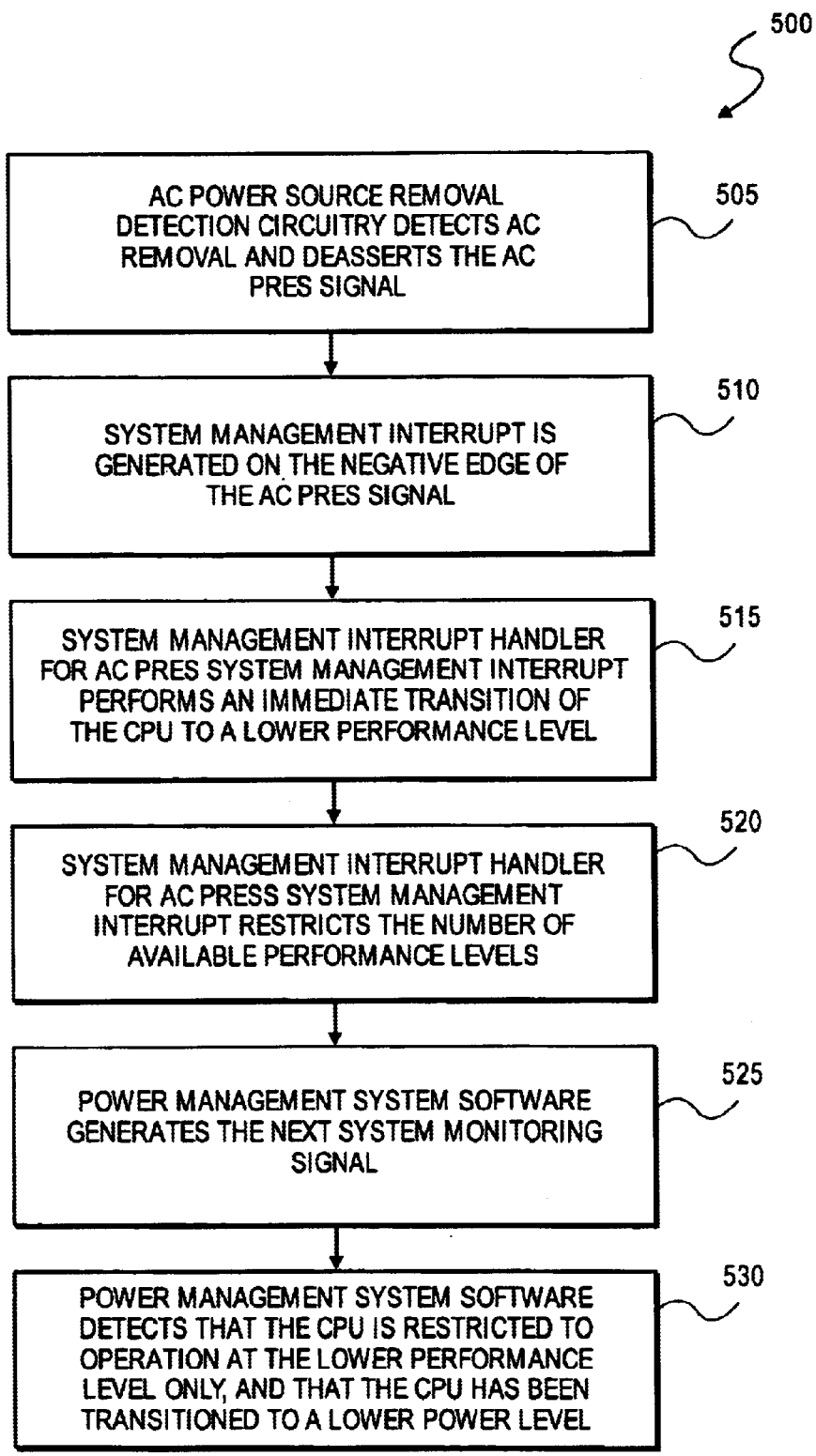
FIG. 5 is a process flow diagram according to one embodiment of the present invention.

FIG. 5 is a process flow diagram according to one embodiment of the present invention. The process 500, shown in FIG. 5, begins at operation 505 in which the AC power removal detection circuitry detects removal of the AC power and de-asserts the AC present signal. This event causes an SMI to be generated at operation 510. At operation 515 the SMI handler (a system management based BIOS code) for the AC present SMI immediately transitions the CPU from a high performance level to a lower performance level (i.e., a performance level that will not cause unwanted system shutdown). It does this by making a call to the existing PMS code (i.e., the polled software described above). This call stops the CPU and changes (i.e., lowers) the CPU frequency, thus lowering the CPU operating voltage. This transition takes approximately 200 microseconds.

At this point, if no further action is taken, the software would be confused. This is because approximately every two seconds the PMS monitors the current CPU performance level, the CPU performance level the user would like, and the presence of AC power. To ensure that the system remains synchronized, the SMI handler updates variables in the existing PMS code at operation 520. This update includes informing the PMS that the AC power has been removed and that the CPU is operating at a lower performance level.

At the next scheduled time, the PMS generates another system-monitoring signal at operation 525. Since the PMS now contains code updated by the SMI, it detects that the CPU is restricted to operation at lower performance levels and that the CPU has been transitioned to a lower performance level, operation 530.

The software of one embodiment of the present invention can transition the CPU to a lower performance level within 255 microseconds. This provides a total transition time, including the 55 microseconds required to detect the AC power removal, of 310 microseconds. This detection and transition time is well below the 2 ms grace period provided by the residual power of the system capacitors.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
    detecting AC power removal from a computing system, the computing system having at least one higher CPU performance level for AC power operation, at least one lower CPU performance level for DC power operation, and a power management software to transition the CPU to a lower CPU performance level upon the removal of AC power; and
    transitioning the CPU to a lower performance level before a residual AC power is exhausted such that unwanted system shutdown is avoided.

2. The method of claim 1, wherein the residual AC power is exhausted in two milliseconds.

3. The method of claim 2, wherein the AC power removal is detected within 55 microseconds.

4. The method of claim 2, wherein AC power removal is detected through use of a differential voltage detection circuit.

5. The method of claim 2, wherein AC power removal is detected through use of a current detection circuit.

6. The method of claim 1 further comprising:
    restricting CPU operation to a lower performance level; and
    informing the power management software that the CPU has been transitioned to a lower performance level.

7. A machine-readable medium that provides executable instructions, which when executed by a processor, cause the processor to perform a method, the method comprising:
    receiving a signal indicating AC power removal from a computing system, the computing system having at least one higher CPU performance level for AC power operation, at least one lower CPU performance level for DC power operation, and a power management software to transition the CPU to a lower CPU performance level upon the removal of AC power; and
    transitioning the CPU to a lower performance level before a residual AC power is exhausted such that unwanted system shutdown is avoided.

8. The machine-readable medium of claim 7, wherein the residual AC power is exhausted in two milliseconds.

9. The machine-readable medium of claim 8, wherein the AC power removal is detected within 55 microseconds.

10. The machine-readable medium of claim 8, wherein AC power removal is detected through use of a differential voltage detection circuit.

11. The machine-readable medium of claim 8, wherein AC power removal is detected through use of a current detection circuit.

12. The machine-readable medium of claim 7 wherein the method further comprises:
   restricting CPU operation to a lower performance level; and
   informing the power management software that the CPU has been transitioned to a lower performance level.

13. An apparatus comprising:
   an AC power removal detection unit to detect AC power removal from a computing system, the computing system having at least one higher CPU performance level for AC power operation, at least one lower CPU performance level for DC power operation, and a power management software to transition the CPU to a lower CPU performance level upon the removal of AC power; and
   a CPU performance level transition unit to transition the CPU to a lower performance level before a residual AC power is exhausted such that unwanted system shutdown is avoided.

14. The apparatus of claim 12, wherein the residual AC power is exhausted in two milliseconds.

15. The apparatus of claim 13, wherein the AC power removal is detected within 55 microseconds.

16. The apparatus of claim 14, wherein AC power removal is detected through use of a differential voltage detection circuit.

17. The apparatus of claim 14, wherein AC power removal is detected through use of a current detection circuit.

18. The apparatus of claim 13 further comprising:
   a CPU performance level restriction unit to restrict CPU operation to a lower performance level; and
   a to inform the power management software that the CPU has been transitioned to a lower performance level.

* * * * *